United States Patent
Bertin et al.

(10) Patent No.: US 6,687,993 B1
(45) Date of Patent: *Feb. 10, 2004

(54) METHOD FOR FITTING A CYLINDER ASSEMBLY INTO A CYLINDER HOUSING

(75) Inventors: David Bertin, Petit Couronne (FR); Emmanuelle Bischoffe, Boulogne Billancourt (FR)

(73) Assignee: Renault, Boulogne Billancourt (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/787,914

(22) PCT Filed: Oct. 1, 1999

(86) PCT No.: PCT/FR99/02340

§ 371 (c)(1),
(2), (4) Date: Jun. 19, 2001

(87) PCT Pub. No.: WO00/20163

PCT Pub. Date: Apr. 13, 2000

(30) Foreign Application Priority Data

Oct. 2, 1998 (FR) .............................. 98 12350

(51) Int. Cl.⁷ ................................ B23P 15/10
(52) U.S. Cl. .............................. 29/888.044; 29/402.03; 29/223; 29/269; 29/281.1; 29/283
(58) Field of Search ................ 29/888.01, 888.044, 29/888.041, 222, 223, 224, 269, 280, 283, 263, 252, 281.1, 888.011, 402.03, 402.08; 294/902, 115, 88; 254/89 H, 93 L; 269/44, 45, 900

(56) References Cited

U.S. PATENT DOCUMENTS

| 887,103 | A | * | 5/1908 | Lane |
| 1,075,384 | A | * | 10/1913 | Seidel |
| 1,602,704 | A | * | 10/1926 | Renari |
| 1,741,110 | A | | 12/1929 | Heinrich |
| 2,716,272 | A | * | 8/1955 | Wenk et al. ............. 29/224 |
| 3,793,718 | A | | 2/1974 | Okazaki |
| 4,047,276 | A | * | 9/1977 | Albers .................. 29/222 |
| 4,463,635 | A | * | 8/1984 | Hafla et al. |
| 4,843,697 | A | * | 7/1989 | Marshall ............. 29/888.01 |
| 5,233,740 | A | | 8/1993 | Chen |
| 6,098,972 | A | * | 8/2000 | Klimach et al. |
| 6,367,141 | B1 | * | 4/2002 | Cook et al. ......... 29/888.044 |

FOREIGN PATENT DOCUMENTS

| DE | 42 16 564 | 12/1992 |
| JP | 56-76349 | 6/1981 |
| JP | 59-115129 | 7/1984 |
| JP | 2-88132 | 3/1990 |
| JP | 9-1433 | 1/1997 |

* cited by examiner

*Primary Examiner*—Charles T. Jordan
*Assistant Examiner*—T. Nguyen
(74) *Attorney, Agent, or Firm*—Oblon, Spivak, McClelland, Maier & Neustadt, P.C.

(57) ABSTRACT

A method for fitting a cylinder assembly into an internal combustion cylinder housing includes the steps of gripping the connected rod-pin-piston assembly with a gripper or clamp and lowering the connected rod-pin-piston assembly, gripped by the gripper or clamp, onto the head surface of the engine cylinder. The connected rod-pin-piston assembly is then inserted into the engine cylinder being thrust by an actuator passing through the gripper or clamp.

6 Claims, 3 Drawing Sheets

METHOD FOR FITTING A CYLINDER ASSEMBLY INTO A CYLINDER HOUSING

CROSS-REFERENCE TO RELATED APPLICATIONS

Figure 1:
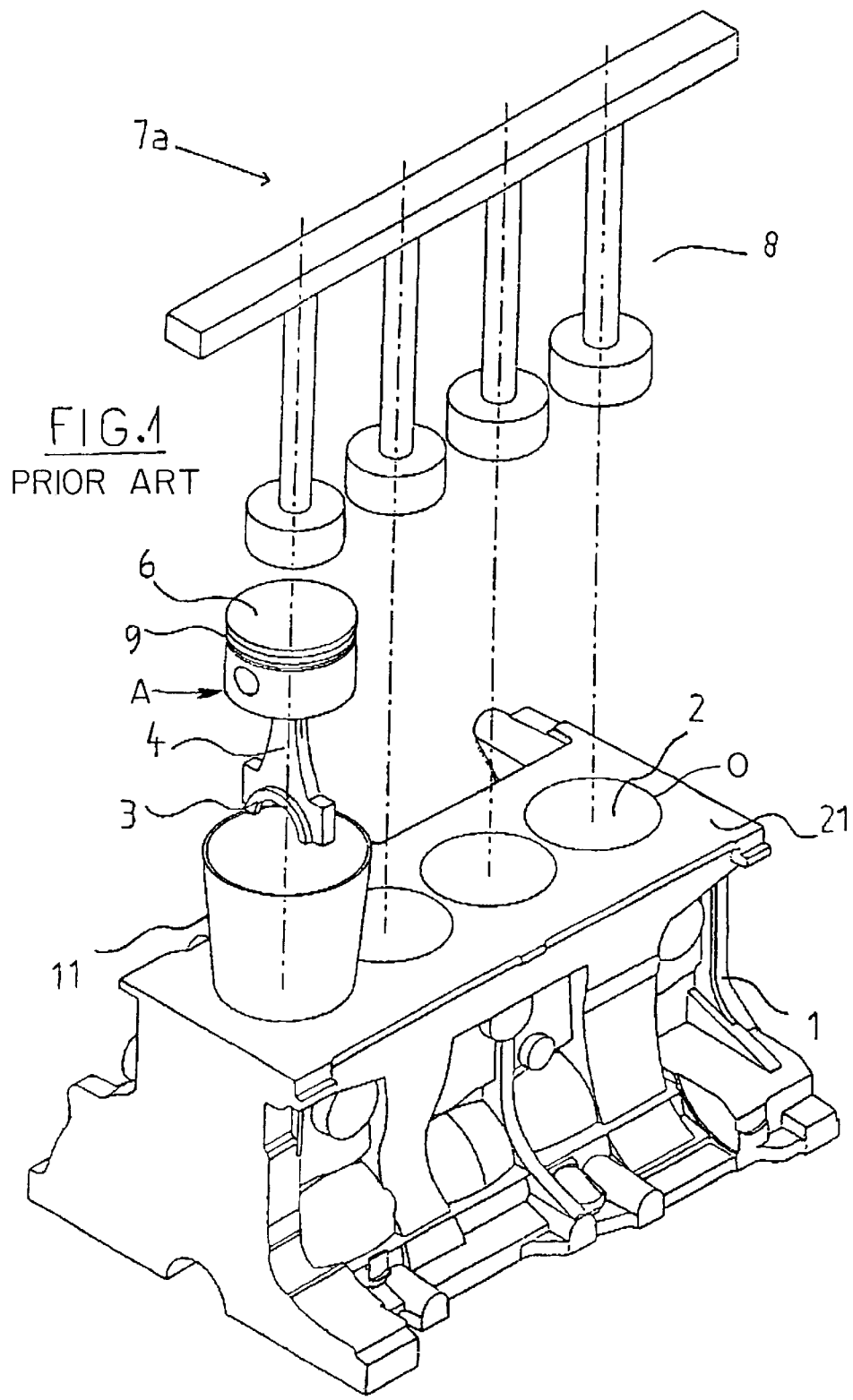

This application is related to and claims priority, under 35 U.S.C. §119, from French patent application no. 98/12350 filed in the French Patent Office on Oct. 2, 1998, the entire contents of which are hereby incorporated by reference herein.

BACKGROUND OF THE INVENTION

1. Field of the Invention

The present invention generally relates to the mounting of a connected rod-pin-piston assembly in an internal combustion engine cylinder housing.

2. Discussion of Background

The mounting of connected rod-pin-piston assemblies in engine cylinders is carried out with a press on the engine assembly line. That operation, which simultaneously ensures placement of the pistons in the cylinders and tightening of the piston rings on the pistons, requires precise positioning of those different parts at the entrance to the cylinders before lowering the mounting press.

According to a known method, positioning and guiding elements called "necking cones" are placed at the entrance to the cylinders, which ensure tightening of the pistons on mounting. The arrangement of the necking cones on the cylinder housing, as well as that of the connected rod-pin-piston assemblies in the cylinder housing, cylinder by cylinder, before lowering of the press, are tedious manual operations, which affect the efficiency of the assembly lines.

The diversification of engines assembled on the same manufacturing site has led to a search for greater "flexibility" of production lines, for example, by simplifying the means of assembly or developing tools compatible with different families of engines, with a view to reducing the number of those tools and facilitating their use.

SUMMARY OF THE INVENTION

The present invention is aimed at making possible the use of the same equipment for mounting different types of connected rod-pin-piston assemblies, while simplifying the operations necessary.

The present invention proposes for that purpose that each connected rod-pin-piston assembly be gripped by a clamp and lowered by the clamp onto the head surface of the engine and then inserted into a cylinder under the thrust of a jack passing through the central hole of the clamp.

In accordance with the present invention, each clamp ensures tightening of the piston rings.

The clamp preferably has fingers movable radially inwardly in order to grip the connected rod-pin-piston assembly.

The present invention also concerns a device for mounting a connected rod-pin-piston assembly in an internal combustion engine cylinder housing. This device has at least one clamp with several fingers movable radially inwardly in order to grip the piston and simultaneously ensure tightening of the piston rings.

BRIEF DESCRIPTION OF THE DRAWING FIGURES

Figure 2:
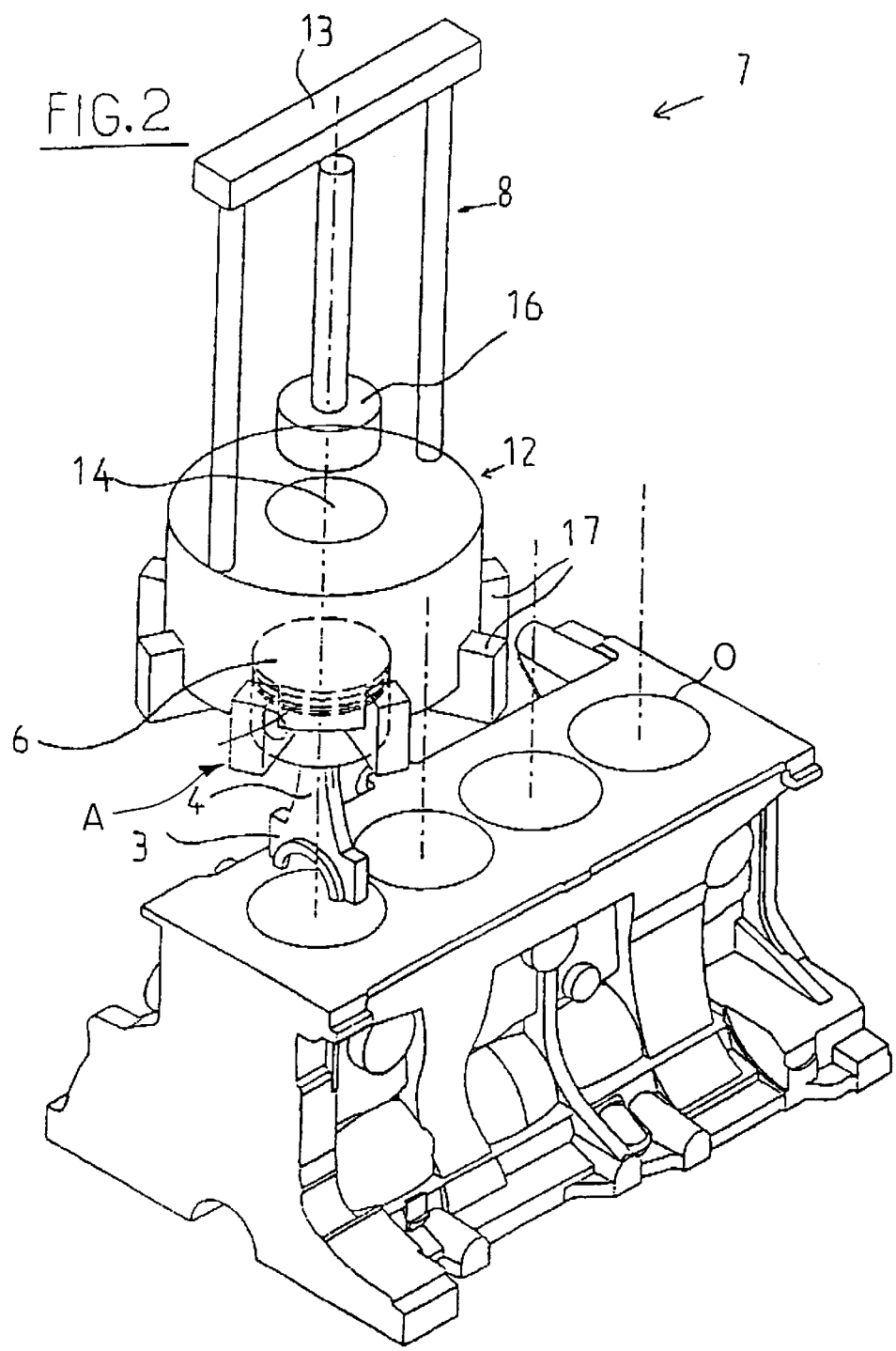
Figure 3:
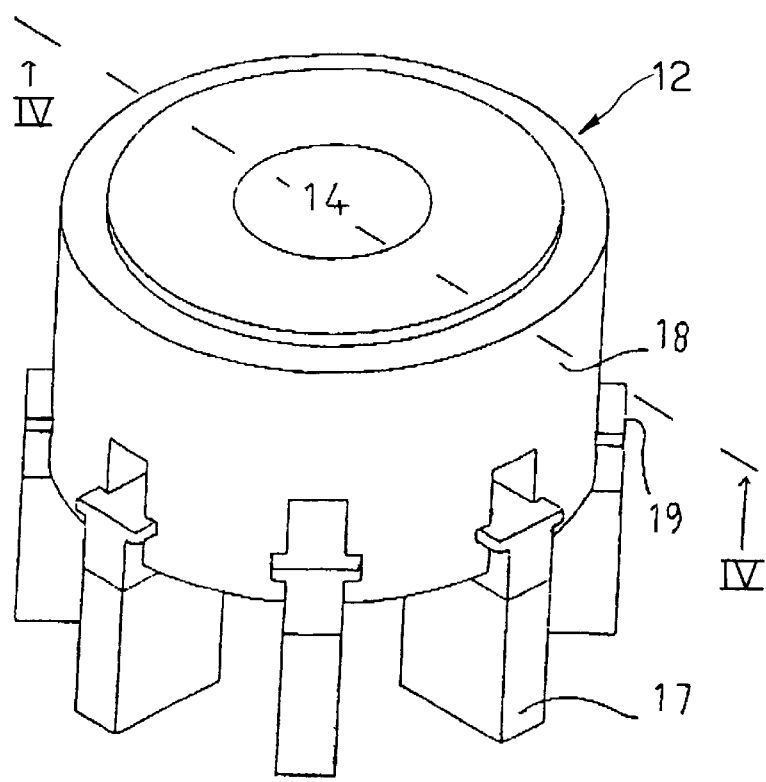

Other characteristics and advantages of the present invention will clearly appear on reading the following description of an embodiment of the present invention, in relation to the attached drawings, in which:

FIG. 1 illustrates the known state of the art;

FIG. 2 schematically represents the device of the present invention;

FIG. 3 relates to a particular embodiment of a tightening clamp; and

Figure 4:
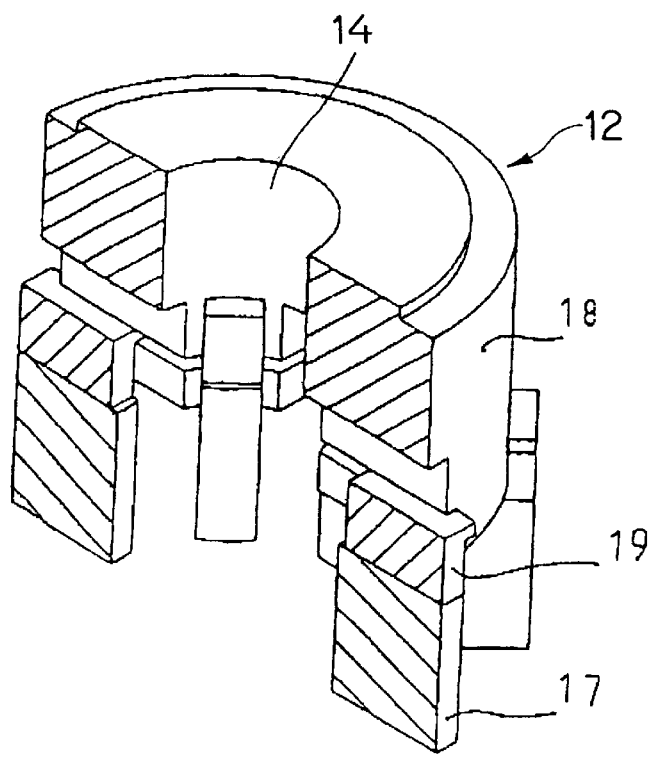

FIG. 4 is a vertical cross-section taken along line IV—IV of FIG. 3.

DETAILED DESCRIPTION OF THE PREFERRED EMBODIMENTS

Referring to FIG. 1, an engine housing 1 is schematically represented with a head surface 21 and four cylinders 2, each intended to be fitted with a connected rod-pin-piston assembly A, the connected rod-pin-piston assembly A being comprised a rod 3, a pin 4, and a piston 6, under the action of a mounting press 7a equipped with actuators 8. As previously indicated, tightening of the piston rings 9 on the pistons 6 and mounting of the connected rod-pin-piston assemblies A, each connected rod-pin-piston assembly A being comprised of a rod 3, a pin 4, and a piston 6, using a mounting press and actuator system, as shown in FIG. 1, require the operator to position a necking cone 11 on the opening O of each cylinder 2, as well as the connected rod-pin-piston assemblies A, each connected rod-pin-piston assembly A being comprised of a rod 3, a pin 4, and a piston 6, in the cones 11 before lowering of the actuators 8.

When the same mounting press 7a is used for the assembly of different engines, it is necessary to arrange specific necking cones 11 for each engine. The diversification of engines on the same site therefore results in multiplying the number of parts references handled on the latter.

In accordance with the present invention, the mounting of connected rod-pin-piston assemblies A in the cylinder housing I is carried out mechanically, without necking cones 11. Referring to FIG. 2, it is seen that the clamp 12 is capable of: supporting a connected rod-pin-piston assembly A being comprised of a rod 3, a pin 4, and a piston 6; guiding that connected rod-pin-piston assembly A opposite the opening O of a cylinder 2; and contracting the piston rings 9 on lowering of the jack 16. The clamps 12, suspended from the frame 13 of the mounting press 7 or fastened to the end of a robot (not represented), are provided with a center hole 14 allowing passage of a jack 16 and fingers 17, which grip the pistons 6.

FIGS. 3 and 4 show that the body 18 of the clamp 12 is supports a plurality of jaws 19 in a radially direction of the body 18 of the clamp 12, and a finger 17 is fastened on each of the jaws 19, bringing the piston rings 9 in contact, so as to tighten the piston rings 9 on the pistons 6, on closing the clamp 12.

Mounting of the connected rod-pin-piston assemblies A, each connected rod-pin-piston assembly A being comprised of a rod 3, a pin 4, and a piston 6, in the cylinders 2 is carried out as follows. When the clamp 12 is in a high position, each connected rod-pin-piston assembly A is gripped by a clamp 12, provided by a robot, or on a machine frame. The clamp 12 is then lowered on the piston 6, which enters a center hole 14 in the body 18 of the clamp 12. Closing of the clamp 12 on the piston 6 is carried out by the inward radial displacement of the jaws 19 and therefore, of the fingers 17, which tighten the piston rings 9. The clamp 12 holding the piston 6 is then lowered until the fingers 17, still tightened around the piston 6, come to rest on the top or head surface 21 of the housing 1. Finally, actual mounting is carried out by lowering of the jacks 16, which drive the pistons 6 inside each cylinder 2.

The advantages of the present invention are numerous. In the first place, it makes it possible to mount connected rod-pin-piston assemblies of different types with the same equipment, for the clamps adapt themselves to the diameter of the pistons they grip, without having to handle accessories, such as specific necking cones, for each engine. Furthermore, those clamps have a triple function, since they are capable of gripping the pistons, tightening the piston rings and positioning the connected rod-pin-piston assemblies at the cylinder entrance, before the actual mounting operation.

The elimination of manual positioning of the necking cone and piston makes it possible to reduce mounting cycle times considerably.

Finally, it is to be noted that the number and shape of the fingers of the clamp or shape of the jaws can be very variable without thereby departing from the scope of the present invention, the working example illustrated by the figures not being limitative in that regard.

What is claimed as new and desired to be secured by letters patent of the united states is:

1. A method of mounting a connected rod-pin-piston assembly in an internal combustion engine cylinder housing, the method comprising the steps of:

gripping the connected rod-pin-piston assembly by a clamp, wherein the gripping of the connected rod-pin-piston assembly by the clamp includes gripping by fingers which are displaceable radially inwardly on and relative to a clamping body;

lowering the connected rod-pin-piston assembly gripped by the clamp onto a head surface of the internal combustion engine cylinder housing; and inserting the connected rod-pin-piston assembly gripped by the clamp into a cylinder of the internal combustion engine cylinder housing under a thrust of a jack passing through a central hole of the clamp.

2. The method of mounting according to claim 1, wherein the gripping of the connected rod-pin-piston assembly by the clamp includes tightening of piston rings on a piston of the connected rod-pin-piston assembly, when the connected rod-pin-piston assembly is mounted in the internal combustion engine cylinder housing.

3. The method of mounting according to claim 1, wherein the gripping by the fingers ensure tightening of piston rings on the piston of the connected rod-pin-piston assembly.

4. The method of mounting according to claim 1, wherein the gripping by the fingers includes resting the fingers against the head surface upon a lowering of the jack.

5. The method of mounting according to claim 4, wherein the lowering of the jack includes passing the jack through the central hole of the clamp.

6. The method of mounting according to claim 1, wherein the gripping of the connected rod-pin-piston assembly by the clamp ensures a necking cone function.

* * * * *